United States Patent [19]

Lisec

[11] Patent Number: 4,886,410

[45] Date of Patent: Dec. 12, 1989

[54] APPARATUS FOR THE MANIPULATION OF SPACER FRAMES

[76] Inventor: Peter Lisec, Bahnhofstrasse 34, A-3363 Amstetten-Hausmening, Austria

[21] Appl. No.: 203,070

[22] Filed: Jun. 6, 1988

[30] Foreign Application Priority Data

Jun. 9, 1987 [AT] Austria ................................ 1451/87

[51] Int. Cl.[4] ................................ B65G 61/00

[52] U.S. Cl. ................................ 414/27; 414/798.5; 414/908; 414/391; 414/398; 198/431; 198/409; 198/487.1

[58] Field of Search .............. 414/27, 390, 391, 798.2, 414/798.3, 798.6, 798.5, 908, 910, 398, 266, 10, 392, 350; 198/725, 836, 431, 409, 407, 487.1

[56] References Cited

U.S. PATENT DOCUMENTS

| | | | |
|---|---|---|---|
| 2,558,503 | 6/1951 | Young | 198/431 X |
| 2,700,332 | 1/1955 | Donald | 198/407 X |
| 4,615,431 | 10/1986 | Lisec | 198/468.6 |

FOREIGN PATENT DOCUMENTS

| | | | |
|---|---|---|---|
| 0192921 | 5/1988 | European Pat. Off. . | |
| 736056 | 4/1943 | Fed. Rep. of Germany | 198/409 |
| 2903649 | 8/1984 | Fed. Rep. of Germany . | |
| 3224862 | 6/1985 | Fed. Rep. of Germany . | |
| 3223881 | 9/1985 | Fed. Rep. of Germany . | |
| 706498 | 3/1954 | United Kingdom | 198/431 |

*Primary Examiner*—Robert J. Spar
*Assistant Examiner*—James T. Eller, Jr.
*Attorney, Agent, or Firm*—Young & Thompson

[57] ABSTRACT

In an apparatus whereby spacer frames (1) for insulating glass being transported in an essentially vertical position and resting against a supporting wall (2, 6) to a receiving station, may be transferred on a carrier (20), in the area of the receiving station (5) in the supporting wall (6) a plurality of lifting elements (14) is provided, which may be moved upwards in slots (13) to raise the spacer frames (1). To be able to transfer a spacer frame (1) to the carrier (20) for spacer frames (1) located opposite the receiving station (5), the distance between the free ends (30) of the beams (21) of the carrier (20) facing the supporting wall (6) provided in the receiving station (5) and the supporting wall (6) may be reduced for example by the forward tilting of the supporting wall (6). When the supporting wall (6) is tilted forward, the free ends (30) of the beams (21) of the carrier (20) engage two openings (17) in the supporting wall (6) and one spacer frame (1) is transferred to the carrier 20.

12 Claims, 2 Drawing Sheets

APPARATUS FOR THE MANIPULATION OF SPACER FRAMES

FIELD OF THE INVENTION

The invention concerns an apparatus for the manipulation of spacer frames for insulating glass, which are conveyed essentially in a vertical position to a receiving station, with a plurality of lifting elements upwardly mobile in slots of a lateral support, for example a supporting wall, against with the spacer frames are abutting.

BACKGROUND OF THE INVENTION

It is known to move spacer frames from a conveyor installation to a receiving station following their coating with a sealing or adhesive mass, with the spacer frames abutting during their transport against a lateral support. In the receiving station the spacer frames are gripped by lifting elements, raised and transferred to or taken over by, for example, a hanging conveyor.

Following the welding of the free ends of hollow profile strips bent into spacer frames, the spacer frames again must frequently be taken over by a linear conveyor on which they are transported in a standing position and moved on for further processing (coating with adhesive or sealing means or the deposition on the spacer frames of drying substances).

A problem of the known installation is that the spacer frames are suspended on the hanging conveyor at relatively large distances from each other, so that they require much space.

OBJECT OF THE INVENTION

It is the object of the invention to provide an apparatus of the aforementioned generic type, whereby the spacer frames transported, for example, from a welding installation in which the hollow strip profiles are welded at their free ends into closed spacer frames, may be stacked intermediately in an optimally space saving manner, so that they may be conveyed subsequently for further processing, for example, to a frame coating installation or an apparatus for the filling of the spacer frames with a hygroscopic material (molecular sieve).

THE PRIOR ART

An apparatus for the bending of hollow strip profiles into spacer frames is known from DE-P 32 23 881.

An apparatus for the butt welding of hollow strip profiles is known from EP-Al-192 921.

An apparatus for the coating of spacer frames with an adhesive or sealing substance is known from DE-P 29 03 649.

An apparatus for the filling of hollow strip profiles bent into spacer frames with a hygroscopic material is disclosed in DE-OS 32 24 862.

BRIEF SUMMARY OF THE INVENTION

The aforedefined object is attained according to the invention by that opposite to the receiving station, a support for the spacer frames with at least two essentially horizontal beams aligned parallel relative to each other is provided, and that the lateral support, in particular the supporting wall, may be tilted around a lower horizontal axis parallel to the beams toward the support, for the transfer of a spacer frame raised by the lifting element on said lateral support, in particular the supporting wall, to the beams.

By means of the apparatus according to the invention, the spacer frames raised up by the lifting elements along the supporting wall may be placed onto the beams of the carrier, so that they are suspended from it, while being held by the beams of the carrier by their upper horizontal legs. The apparatus according to the invention has the further advantage that it is not necessary to slide the spacer frames further on the carrier, so that other spacer frames may be placed upon it, as the spacer frames suspended from the carrier are automatically moved on upon the placing of another spacer frame on the carrier.

An important form of embodiment of the apparatus according to the invention is characterized in that the conveyor device provided on the lower edge of the supporting wall is equipped with a device for the detection of the length of the horizontal leg of the spacer frame to be moved, said device deactivating the conveyor when the spacer frame is aligned symmetrically relative to the lifting elements. It is assured in this manner that the spacer frames are placed symmetrically on the carrier so that even very wide spacer frames do not lose their equilibrium and remain suspended in an oblique position.

BRIEF DESCRIPTION OF THE DRAWINGS

Further characteristics and details of the invention will become apparent from the dependent claims and the description below of the example of embodiment shown in the drawings.

DETAILED DESCRIPTION OF THE INVENTION

Figure 1:
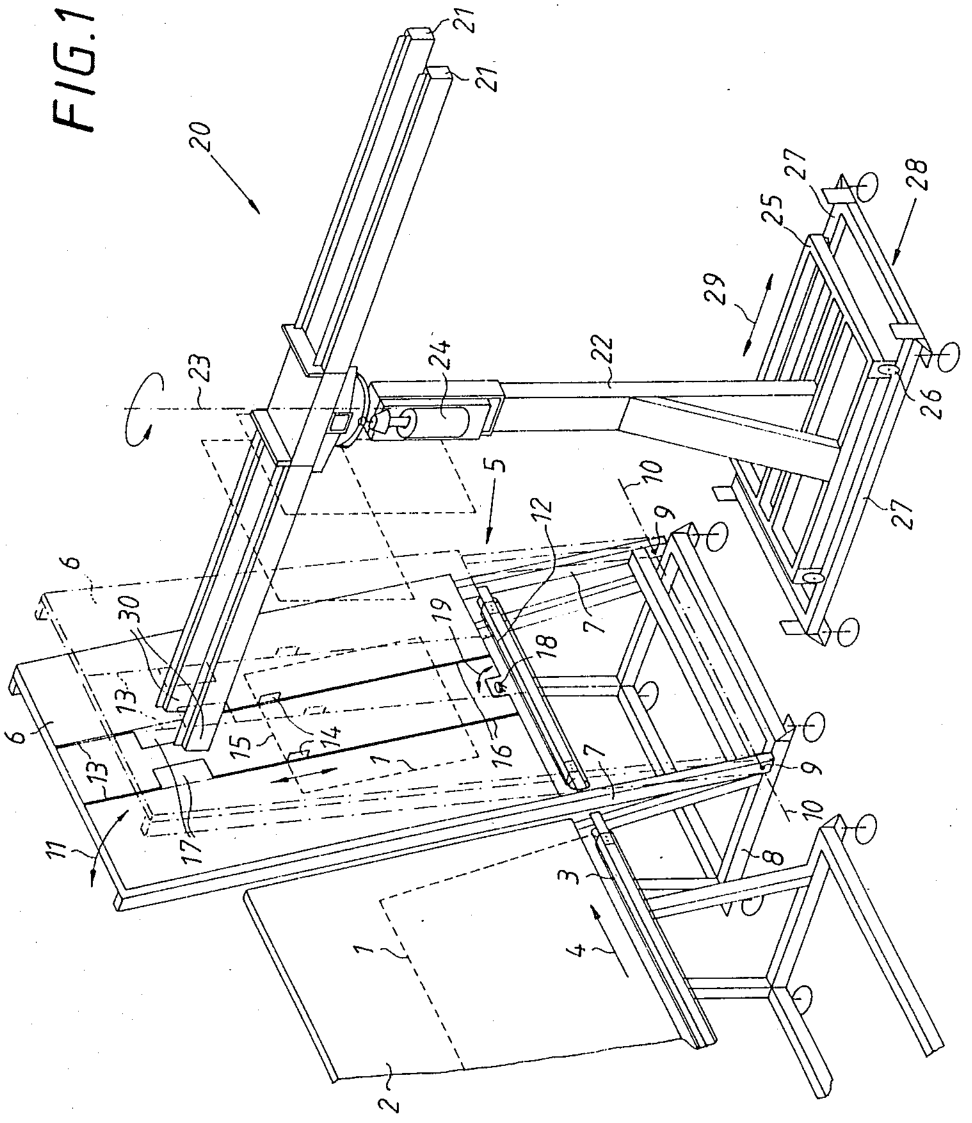
FIG. 1 shows perspectively an apparatus according to the invention.

In the apparatus shown in FIG. 1, the spacer frames 1 are transported with their upwardly projecting parts resting against a supporting wall 2, by a conveyor belt 3 in the direction of the arrow 4 to a receiving station 5.

The supporting wall 6 may be pivoted in the area of the receiving station 5 by means of bars 7 in the machine frame 8 in pivot bearings 9, around an axis 10 aligned parallel relative to the conveyor direction 4, in the direction of the double arrow 11, from the position drawn by solid lines in FIG. 1, into the position indicated by broken lines in FIG. 1. For the pivoting of the supporting wall 6, a pressure operated motor, not shown, supported on the machine frame 8 and acting on the supporting wall 6, is provided.

The supporting wall is also equipped at its lower end by a conveying device (conveyor belt) 12.

In the supporting wall 6, two essentially vertical slots 13 are provided. These slots are passed through by lifting elements 14, with said elements 14 serving to grip a spacer frame 1 by its upper horizontal leg 15 and moving it upwards along the supporting wall.

In order not to hinder the transport of spacer frames 1 into the receiving station 5 by the lifting elements 14, the latter are guided so that in the area of the lower ends 16 of the slots they no longer project in the forward direction. This may be obtained in a simple manner by locating the endless elements (for example chains) supporting and driving the reversing rolls for the lifting elements 14 slightly above the lower edge of the supporting wall 6.

The lifting elements 14 raise the spacer frame 1 until its upper horizontal leg 15 is located above the openings 17 provided in the supporting wall 6.

The conveyor means 12 at the lower end of the supporting wall 6 is controlled in a manner such that a spacer frame 1 transported into the receiving station 5 is halted exactly symmetrical to the two lifting elements 14. In order to prevent the slipping of the spacer frame 1 on the conveyor belt 12, in particular during the braking phase, a contact pressure roll 18 is associated with the conveyor belt 12, with said pressure roll 18 being capable of pivoting from a rest position (FIG. 1) in which it is located behind the supporting wall 6, forward (arrow 19) so as to abut from above against the leg of the spacer frame resting on the conveyor belt 12, whereby the necessary frictional lock between the conveyor belt 12 and the leg of the frame is provided. To center the spacer frame 1 relative to the lifting elements 14, devices are provided to detect the length of the lower horizontal leg of the spacer frame 1 (for example a light barrier responding to the upwardly projecting leg of the spacer frame 1 in combination with the predetermined conveyor velocity), wherein then a further light barrier is provided, which arrests the conveyor belt 12 after the passing of the first upwardly projecting leg of the spacer frame 1, and after the spacer frame has been moved on by one-half of the length of the horizontal leg, so that the spacer frame is located symmetrically relative to the lifting elements 14.

Opposite to the receiving station 5, a carrier 20 is provided. The carrier 20 comprises two horizontal beams 21, which may be rotated on the upper end of a tower 22 around a vertical axis 23 by a drive motor 24. The tower 22 carrying the beams 21 may be displaced on a carriage 25 by means of four rolls 26 on the rails 27 of a socket 28, supported by feet on the floor, in the direction of the double arrow 29, i.e. transversely to the conveying plane of the spacer frame 1. For the displacement of the tower 22 and thus the carrier 20, a pressure operated motor, not shown in detail, is provided.

The horizontal beams 21 of the carrier 20 extend into the vicinity of the supporting wall 6 and are located so that in the forward tilted position of the supporting wall 6, indicated by the broken line, they engage with their free ends 30 the openings 17 in the supporting wall 6.

By lowering the lifting elements 14, a spacer frame 1 previously raised above the openings 17 may then be transferred to the beams 21.

Upon the forward tilting of the supporting wall 6 into the position shown by the broken line in FIG. 1, any spacer frames already suspended from the beams 21 are moved simultaneously along the beams 21 in the direction of the tower 22 of the carrier 20.

In order to protect the spacer frames 1, the top sides of the beams 21 may be equipped with strip like supports of rubber or plastic profiles.

When one half of the beams 21 is completely loaded with spacer frames, the sliding of spacer frames 1 onto the beams 21 is interrupted, which may be triggered for example by a switch located in the center of the beam 21, and the beams 21 are rotated around the axis 23 by actuating the motor 24, so that their half not loaded with spacer frames 1 is facing the receiving station 5 (supporting wall 6) and the placement of spacer frames 1 on the beams 21 may be resumed.

Figure 2:
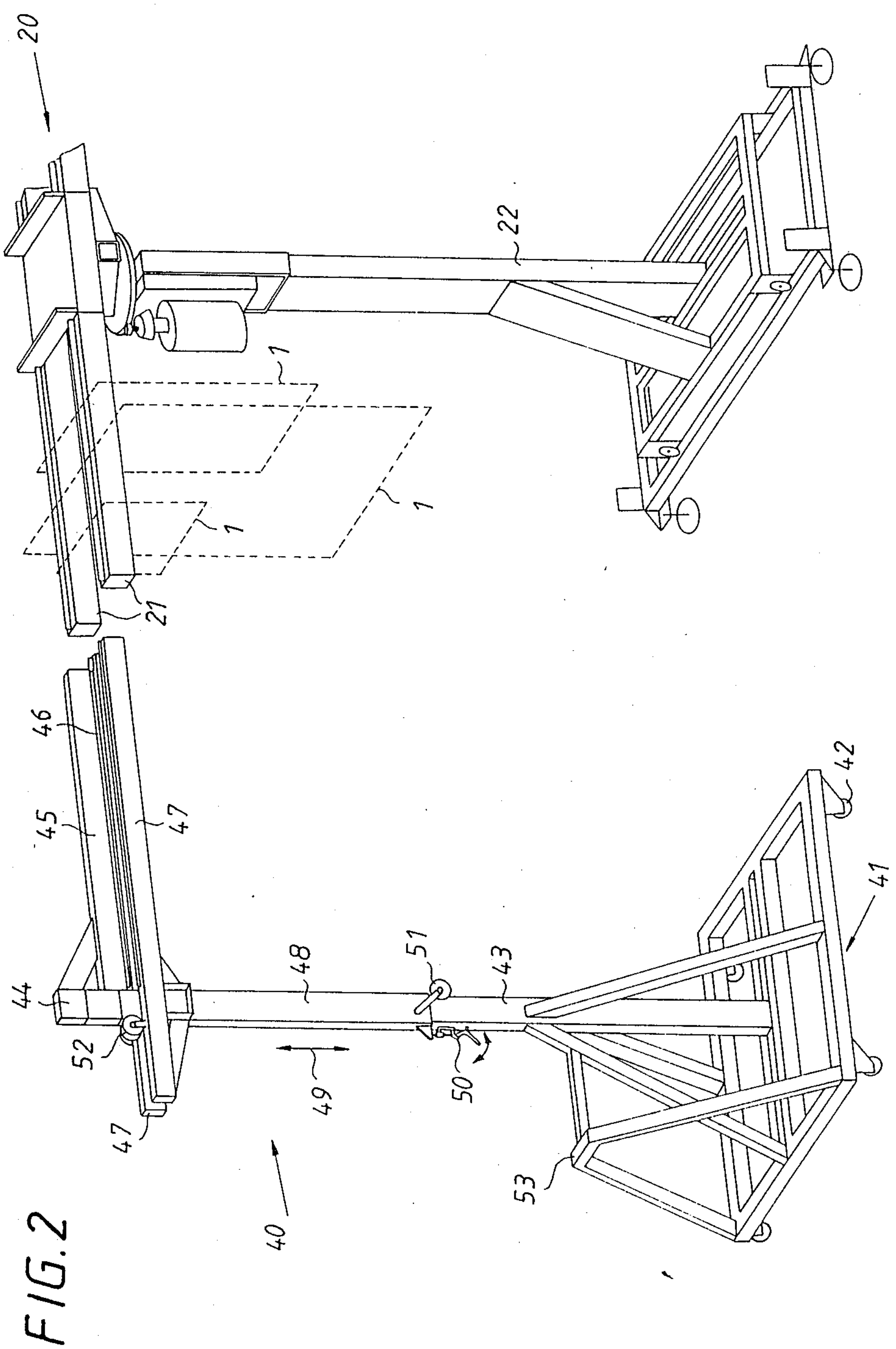
FIG. 2 shows a gripping device to take off the spacer frames suspended from the carrier.

In order to take off the spacer frames suspended from the carrier 20 and transport them to further processing facilities, the gripping device 40 shown in FIG. 2 is provided.

The gripping device 40 comprises a carriage 41 that may be displaced and rotated by means of wheels 42 resembling furniture casters in any direction. On the carriage 41, a column 43 is mounted in an upwardly projecting manner, said column being connected at its upper end 44 with a horizontally extending prong 45. The prong 45 is equipped at its bottom side with a strip shaped support 46 of rubber or plastic.

The gripper device 40 further comprises two prongs 47, which by means of a guide sleeve 48 may be slid up and down along the column 43 in the direction of the double arrow 49. To actuate the sleeve 48 and thus the prongs 47, a manual lever 50 with a knee action mechanism acting on the one hand on the sleeve 48 and on the other on the column 43, is provided. The sleeve 48 is guided on the column 43 by means of the guide roll pairs 51 and 52.

The height of the prong 45 of the gripping device 40 is chosen so that the prong 45 is located slightly higher than the upper outer side of the spacer frames suspended from the carrier 20. By actuating the manual lever 50, the prongs 47 of the gripping device 40 are raised, thereby lifting the spacer frames 1 suspended from the carrier 20, i.e. its beam 21, from said beam and clamping them between itself and the upper prong 45. The gripping device 40 may now be moved from the position wherein it has taken the spacer frames 1 from the carrier 20 (in this position the prongs 45 and 47 are located between the beams 21 or above them), on the carriage 41 to a further station. For the purpose of gripping the spacer frames, a manual lever 53 is provided on the carriage 41, which facilitates the manipulation of the gripping device 40.

I claim:

1. Apparatus for the manipulation of hollow spacer frames for insulating glass, which are conveyed in an essentially vertical upright position to a receiving station, with a plurality of lifting elements displaceable in an upward direction in the area of the receiving station in slots in a substantially vertical lateral supporting wall, against which the spacer frames are abutting, said lifting elements contacting an inner portion of the frame, characterized in that opposite to the receiving stations (5) a carrier (20) with at least two essentially horizontal parallel beams (21) is provided, and that said lateral supporting wall (6) is tilted (11) toward the carrier (20) around a lower horizontal axis (10) aligned parallel to the conveying direction (4) to transfer a spacer frame (1) raised by the lifting elements (14) from along the lateral supporting wall (6), to the beams (21), said beams engaging said inner portion of the frames.

2. Apparatus according to claim 1, characterized in that the supporting wall (6) comprises two openings (17), which are engaged by the free ends (30) of the beams (21) of the carrier (20) in the transfer position, and that the lifting elements (14) may be raised above the openings (17).

3. Apparatus according to claim 1, characterized in that a conveyor means (12) is provided at the lower edge of the supporting wall (6) with a device for the detection of the length of the horizontal leg of the spacer frame (1) to be transferred, said device deactivating the conveyer means (12) when the spacer frame is symmetrically aligned relative to the lifting elements (14).

4. Apparatus according to claim 1, characterized in that a contact pressure roll (18) is provided in the area between the slots (13) for the lifting elements (14), which may be applied to the legs of the spacer frame (1) resting on the conveyor means (12) during the braking phase.

5. Apparatus according to claim 1, charcterized in that light barrier for the detection of the length of the horizontal leg of the spacer frame (1) is provided at the inlet side of the supporting wall (6), said light barrier detecting the leg of the spacer frame (1) projecting upward from the lower horizontal leg of said frame and passing by said light barrier, and controlling the conveyor means (12) in combination with a predetermined conveyor velocity of the conveyor means (12) and a second light barrier provided in the area between the two lifting elements (14).

6. Apparatus according to claim 1, characterized in that the horizontal beams (21) of the carrier (20), which preferably are equipped on their top side with strip shaped supports of an elastic material, such as rubber or plastic, are supported on a tower rotatable around an essentially vertical axis (23), with the beams (21) extending toward both sides of said vertical axis (23), in particular symmetrically relative to said vertical axis (23).

7. Apparatus according to claim 6, characterized in that a drive motor (24) is provided for the rotation of the beams (21) around the vertical axis (23).

8. Apparatus according to claim 6, characterized in that the tower (22) may be displaced on a carriage (25) by means of rolls (26) on rails (27) transversely to the conveying direction (4) and the plane of the supporting wall (6), to and from said supporting wall.

9. Apparatus according to claim 1, characterized in that a gripping device (40), which preferably may be freely displaced on rolls (42), is provided, said gripping device being equipped with essentially horizontally extending prongs (45, 47) which may be aplied to the upper horizontal legs of the spacer frames (1) suspended from the beams (21) of the carrier (20), with said prongs (45, 47) of the gripping device (40) being equipped on their surfaces facing the horizontal leg of the spacer frame (1) with preferably strip like supports (46) of an elastic material, such as rubber.

10. Apparatus according to claim 9, characterized in that the upper horizontal prong or prongs (45) of the gripping device (40) is (are) mounted fixedly on a column (43) located on the carriage (41), while the lower prongs (47) of the gripping device (40) are displaceable up and down along the column (43) carrying the gripping device.

11. Apparatus according to claim 10, characterized in that a manual lever (50) is provided for the actuation of the lower prongs (47).

12. Apparatus according to claim 1, characterized in that the rotatable supporting wall (6) comprises downwardly exending bars (7), the free ends of which are supported in pivot bearings (9) located in the vicinity of the floor in the machine frame (8) and that the supporting wall (6) may be tilted forward and rearward by a pressure operated motor supported on the machine frame (8).

* * * * *